(12) United States Patent
Sawayanagi

(10) Patent No.: US 6,428,077 B1
(45) Date of Patent: Aug. 6, 2002

(54) SECURING STRUCTURE OF AUXILIARY EQUIPMENT FOR VEHICLE

(75) Inventor: Masahiro Sawayanagi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/705,832

(22) Filed: Nov. 6, 2000

(30) Foreign Application Priority Data

Nov. 10, 1999 (JP) ........................................... 11-319666

(51) Int. Cl.[7] .................................................. B60J 3/00
(52) U.S. Cl. ...................................................... 296/97.9
(58) Field of Search ........................................ 296/97.9

(56) References Cited

U.S. PATENT DOCUMENTS

| | | | |
|---|---|---|---|
| 5,082,323 A | * | 1/1992 | Dowd et al. |
| 5,098,151 A | * | 3/1992 | Peterson |
| 5,498,056 A | * | 3/1996 | Viertel et al. |
| 5,533,776 A | * | 7/1996 | Agro et al. |
| 5,544,928 A | * | 8/1996 | Mori et al. |
| 5,752,853 A | * | 5/1998 | Curtindale |
| 6,068,323 A | * | 5/2000 | Brown et al. |
| 6,250,708 B1 | * | 6/2001 | Kurachi |

* cited by examiner

*Primary Examiner*—Joseph D. Pape
*Assistant Examiner*—Scott Carpenter
(74) *Attorney, Agent, or Firm*—Finnegan, Henderson, Farabow, Garrett, & Dunner, L.L.P.

(57) ABSTRACT

A securing structure of vehicle auxiliary equipment comprises harness-side connection ends 11 having peripheral walls 11a in which wire harness-terminals 10 are embedded and portion of the wire harness-terminals 10 being exposed to inner peripheral surfaces of the peripheral walls 11a; grommet screws 13 integrally formed together with a bracket 2 and inserted into the harness-side connection ends 11 which are temporarily secured to securing holes 12; visor-side connection terminals 14 which are connected to electric wires 4 led out from a sun visor 1, and which abut against the wire harness terminals 10 when the grommet screws 13 are inserted into the harness-side connection ends 11; and bolt members 15 which are inserted into the grommet screws 13 in a state in which the grommet screws 13 are inserted into the harness-side connection ends 11, thereby finally securing the bracket 2 and the harness-side connection ends 11 to the securing holes 12.

4 Claims, 4 Drawing Sheets

SECURING STRUCTURE OF AUXILIARY EQUIPMENT FOR VEHICLE

BACKGROUND OF THE INVENTION

1. Field of the Invention

The present invention relates to a securing structure of vehicle auxiliary equipment used for mounting auxiliary equipment such as a sun visor, a room lamp or the like in a passenger room.

2. Description of the Related Art

For example, a sun visor is mounted to a ceiling of an automobile at position corresponding to a driver's seat or a passenger's seat. Some sun visors include vanity mirrors, and some sun visors further include lamps so that the vanity mirrors can also be used at night.

As shown in FIGS. 1A to 1C, in the case of such a sun visor 1 is provided with a lamp, a bracket 2 for securing the sun visor 1 to a vehicle body 100 is mounted to a tip end of a securing shaft 3, and the sun visor 1 is mounted to the vehicle body 100 by securing the bracket 2 to the vehicle body 100 (not prior art). At that time, an electric wire 4 is led out from a shaft tip end 3a through the securing shaft 3, and a connector 7 for connecting to a mating connector 6 of a wire harness 5 which is arranged in the vehicle body 100 is mounted to a tip end of the electric wire 4.

The vehicle body 100 comprises a body 101 and a panel 102 provided inside of the body 101. The wire harness 5 is arranged between the body 101 and the panel 102, and the connector 6 connected to the tip end of the wire harness 5 is led into the passenger room through a bracket mounting hole 102a formed in the panel 102, thereby setting the wire harness 5. The panel 102 comprises a metal plate 103 and a trim 104 laminated on the metal plate 103 on the side of the passenger room (see FIG. 1A).

The bracket 2 is integrally formed with a grommet screw 8 and an engaging piece 9. After the connectors 6 and 7 are connected, the engaging piece 9 is engaged with an edge of the bracket mounting hole 102a. The grommet screw 8 is then pushed into the bracket mounting hole 102a using this engaged portion as a fulcrum (see FIG. 1B). With this operation, the grommet screw 8 can be engaged with the edge of the bracket mounting hole 102a, and the bracket 2 can be secured to the panel 102. By this securing operation of the bracket 2, the sun visor 1 can be mounted to the vehicle body 100 (see FIG. 1C).

In such a conventional securing structure of vehicle auxiliary equipment, however, when the sun visor 1 is mounted to the vehicle body 100, the operator must mount the sun visor 1 with his or her one hand while pushing the connected connectors 6 and 7 into the bracket mounting hole 102a with the other hand. Therefore, the operability is inferior, the productivity is lowered, and the cost is increased. Further, since the connected portion of the connectors 6 and 7 is pushed into the bracket mounting hole 102a without being supported, a noise is generated by this operation.

Further, in order to mount the sun visor 1, it is necessary to push the grommet screw 8 into the bracket mounting hole 102a, but a great pushing force is required and the securing operation is difficult. Also, during the pushing operation, the grommet screw 8 is shaved by the edge of the metal plate 103 constituting the bracket mounting hole 102a and, therefore, the grommet screw 8 may be damaged or deformed, and a holding force of the sun visor 1 is decreased.

Further, since the bracket 2 is provided with the engaging piece 9, the structure is complicated and costs more for a mold, and the productivity is lowered, thereby increasing the costs.

SUMMARY OF THE INVENTION

Thereupon, it is an object of the present invention to provide a securing structure of vehicle auxiliary equipment in which the productivity can be enhanced by excellent operability, the costs can be reduced, and the reliable holding force of the auxiliary equipment can be obtained.

To achieve the above object, according to a first aspect of the invention, there is provided a securing structure of vehicle auxiliary equipment in which the vehicle auxiliary equipment is electrically connected to wire harnesses arranged between a body and a panel provided on an inner side of the body, and the vehicle auxiliary equipment is secured to the panel through the bracket, wherein the securing structure comprises cylindrical harness-side connection ends formed of insulating resin and whose diameters are capable of being widened, the harness-side connection ends having peripheral walls in which wire harness-terminals are embedded, portions of the wire harness-terminals being exposed to inner peripheral surfaces of the peripheral walls; securing holes formed in the panel and through which the harness-side connection ends are temporarily secured; grommet screws integrally formed together with the bracket and inserted into the temporarily secured harness-side connection ends; auxiliary equipment-side terminals connected to electric wires which are led out from the vehicle auxiliary equipment, the equipment-side terminals exposed to outer surfaces of the grommet screws and abutting against the exposed portions of the wire harness-terminals when the grommet screws are inserted into the harness-side connection ends; and securing means which are inserted into the grommet screws in a state in which the grommet screws are inserted into the temporarily secured harness-side connection ends, thereby widening diameters of the harness-side connection ends and the grommet screws to finally securing the bracket and the harness-side connection ends to the securing holes.

According to the first aspect of the invention, the harness-side connection ends is temporarily secured to the securing holes of the panel, the grommet screws are inserted into the harness-side connection ends to temporarily secured the bracket and then, the bolt members are screwed into the grommet screws, thereby finally secured the bracket and the harness-side connection ends to the panel. With this final securing operation, the sun auxiliary equipment can be mounted to the vehicle body while electrically connecting the auxiliary equipment-side connection terminals and the wire harness-terminals with each other.

At that time, the wire harness terminals are embedded in insulating resins and insulated against the panel. Since the harness-side connection ends are attached to the securing holes of the panel only temporarily, the harness-side connection ends are not pushed into the securing holes forcibly, and are not damaged nor deformed when it is temporarily attached.

Further, the grommet screws of the bracket are not directly inserted into the securing holes of the panel, but inserted into the harness-side connection ends which are temporarily secured to the securing holes, the bracket is not damaged nor deformed by the edges of the securing holes, and the inserting forces of the grommet screws can be reduced by the auxiliary equipment-side connection terminals provided such that they are exposed to the outer surfaces of the grommet screws and by the wire harness-terminals provided such that they are exposed to the inner peripheral surface of the peripheral walls of the harness-side connection ends. When the grommet screws are inserted into the harness-side connection ends, since surfaces of the wire harness-terminals and the auxiliary equipment-side connection terminals slide on each other, oxide films formed on the surfaces can be removed. Therefore, excellent electrical connection state formed thereafter can be ensured.

The diameters of the harness-side connection ends and the grommet screws are widened by inserting the securing means, thereby bringing the auxiliary equipment-side connection terminals and the wire harness-terminals into contact with each other under pressure, the oxide films can be removed, and more excellent electrical connection state can be ensured.

After the bracket is finally secured to the panel, the bracket is protected by the auxiliary equipment-side connection terminals and rigidity of the bracket is enhanced. Therefore, the holding force of the sun auxiliary equipment is enhanced.

According to a second aspect of the invention, in the securing structure of vehicle auxiliary equipment of the first aspect, the securing means are bolt members screwed into the grommet screws.

With their second aspect, the diameters of the grommet screws can be widened by screwing the bolt members, and the widened diameters can be maintained.

According to a third aspect of the invention, in the securing structure of vehicle auxiliary equipment of the first aspect, the securing means are rod-like projections which are integrally formed together with a cover covering the bracket, and which are inserted into the grommet screws when the cover covers the bracket.

With the third aspect, the securing means and the cover which were constituted by two members in the first embodiment can be constituted by one member. Further, it is possible to simultaneously widen the grommet screws and cover the bracket with the cover by one operation.

According to a fourth aspect of the invention, in the securing structure of vehicle auxiliary equipment of the first aspect, a central annular portion of each of the grommet screws is formed such as to swell outward, and an inner peripheral surface of each of the harness-side connection ends is formed with an annular recess into which the central annular portion of the grommet screw is fitted.

According to this structure, the bracket is finally secured to the panel in such a manner that the diameters of the grommet screws and the harness-side connection ends are widened, and the central annular portions of the grommet screws are fitted into the annular recesses of the harness-side connection ends.

BRIEF DESCRIPTION OF THE DRAWINGS

FIGS. 1A to 1C are sectional views showing the operation procedure of a conventional securing structure of vehicle auxiliary equipment, wherein FIG. 1A shows an initial state, FIG. 1B shows a medium state, and FIG. 1C shows an assembling completed state;

FIGS. 4A and 4B show the securing structure shown in FIG. 2, wherein FIG. 4A shows a temporary secured state, and FIG. 4B shows a finally secured state.

DESCRIPTION OF THE PREFERRED EMBODIMENTS

Embodiments of the present invention will be explained based on the drawings below. In the embodiments, a sun visor 1 is shown as vehicle auxiliary equipment.

Figure 1A:
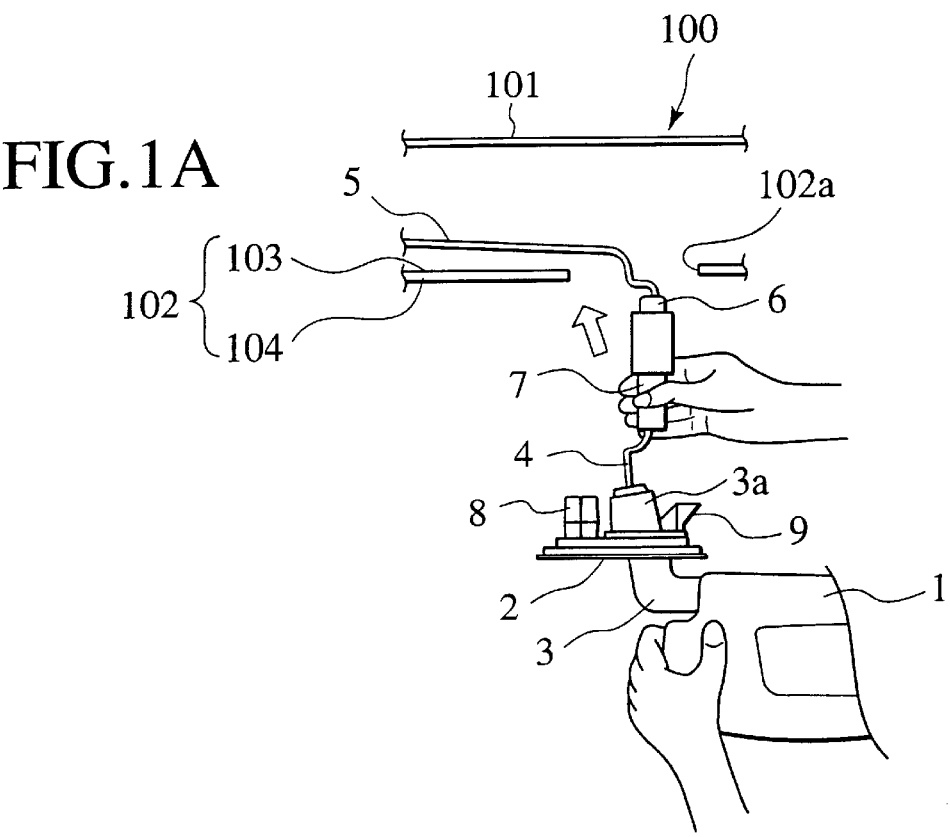
Figure 1B:
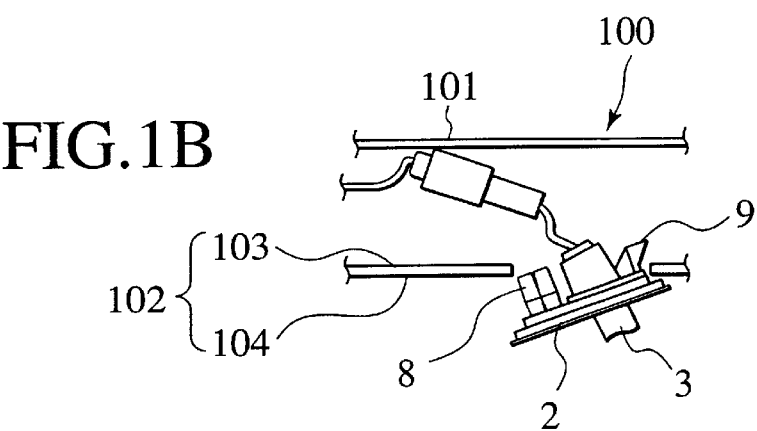
Figure 1C:
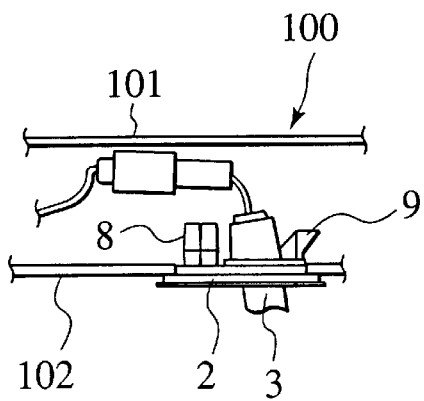
Figure 2:
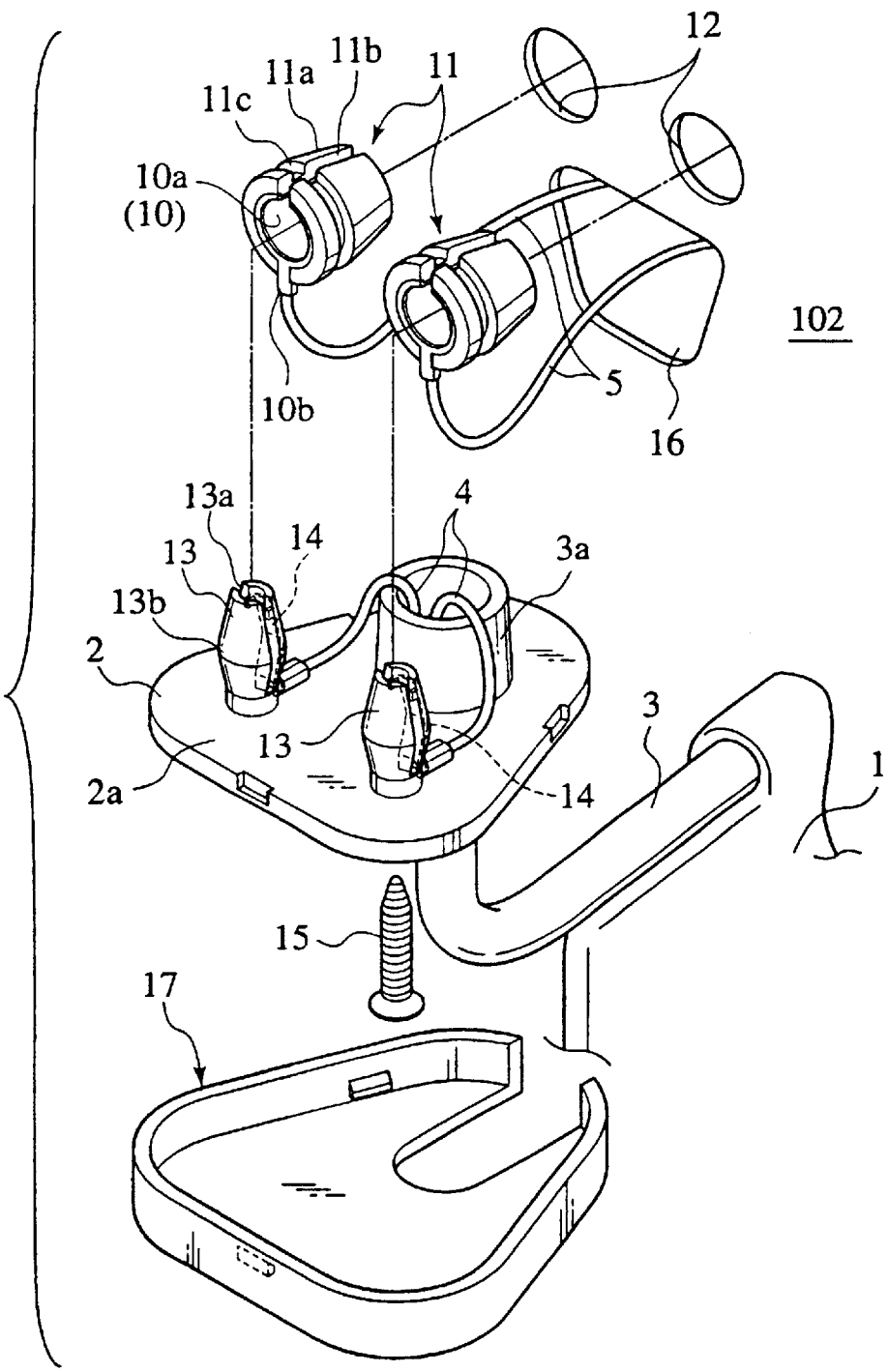
FIG. 2 is an exploded perspective view showing a securing structure of vehicle auxiliary equipment according to a first embodiment of the present invention.
Figure 3:
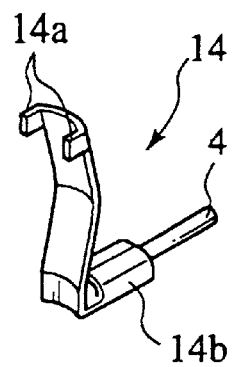
FIG. 3 is a perspective view of a connection terminal on the side of the auxiliary equipment used in the securing structure shown in FIG. 2.

FIG. 2 shows a securing structure of vehicle auxiliary equipment. In this securing structure, a sun visor 1 is electrically connected to wire harnesses 5 arranged between a body and a panel 102 provided on an inner side of the body. At that time, the body (not shown) constitutes a vehicle body 100 together with the panel 102 as shown in FIGS. 1A to 1C. The sun visor 1 is mounted to a securing shaft 3 such that the sun visor 1 can rotate around an axis. The bracket 2 is mounted to a tip end of the securing shaft 3.

This securing structure comprises cylindrical harness-side connection ends 11 formed of insulating resin and whose diameters are capable of being widened. The connector ends 11 have peripheral walls 11a in which wire harness-terminals 10 are embedded. Portions of the wire harness-terminals 10 are exposed to inner peripheral surfaces of the peripheral walls 11a. There are securing holes 12 formed in the panel 102 and through which the harness-side connection ends 11 are temporarily secured. There are grommet screws 13 integrally formed together with the bracket 2 and inserted into the temporarily secured harness-side connection ends 11. Visor-side connection terminals 14 are connected to electric wires 4 led out from the sun visor 1 and exposed to outer surfaces of the grommet screws 13 and abut against the exposed portions of the wire harness-terminals 10 when the grommet screws 13 are inserted into the harness-side connection ends 11. Bolt members 15 as securing means are inserted into the grommet screws 13 in a state in which the grommet screws 13 are inserted into the temporarily secured harness-side connection ends 11, thereby widening diameters of the harness-side connection ends 11 and the grommet screws 13 to finally secure the bracket 2 and the harness-side connection ends 11 to the securing holes 12.

More specifically, the wire harness-terminals 10 of the harness-side connection ends 11 have C-shaped cross sections and are formed of insulating resin by insert molding. Each of the wire harness-terminals 10 is embedded in the harness-side connection end 11 such that an inner surface 10a of the C-shaped cross section is exposed to the inner peripheral surface of the peripheral wall 11a, and a connected portion 10b of the wire harness-terminals 10 is projected outwardly of the peripheral walls 11a. The wire harness 5 is connected to the connected portion 10b. In this manner, the wire harness-terminal 10 is embedded in the insulating resin and insulated against the panel 102. The peripheral walls 11a of the harness-side connection ends 11 are formed with vertical slits 11b so that diameters of the harness-side connection ends 11 can be widened, and central portion of the wire harness-terminals 10 are provided with annular recesses 11c so that the harness-side connection ends 11 can temporarily be secured to the securing holes 12.

Each of the securing holes 12 has a diameter enough to receive the annular recess 11c of the harness-side connection end 11, and the two securing holes 12 are formed in the panel 102. In addition to the securing holes 12, a bracket mounting hole 16 is also formed in the panel 102 in the vicinity of the securing holes 12. The bracket mounting hole is greater than the securing holes 12 so that the shaft tip end 3a of the securing shaft 3 projecting toward one side of the bracket 2 can be inserted into the bracket mounting hole 16 and so that the wire harnesses 5 can be led out.

The two grommet screws 13 are mounted on one side 2a of the bracket 2 from which the shaft tip end 3a projects such that the grommet screws 13 are located at a distance from each other corresponding to a distance between the two securing holes 12. Diameters of the grommet screws 13 can be widened by vertical slits 13a.

Each of the visor-side connection terminals 14 is a metal piece bent into an L-shape. One end of the metal piece is provided with securing pawls 14a, and the other end is provided with an electric wire crimping section 14b. The electric wires 4 led out from the shaft tip end 3a is connected to the electric wire crimping section 14b. One side of the visor-side connection terminal 14 is formed with the electric wire crimping section 14b and placed along the one side 2a of the bracket 2. The securing pawls 14a pierce the grommet screws 13, and the other side of the visor-side connection terminals 14 is formed with the securing pawls 14a, placed along the outer side of the grommet screws 13, and mounted thereto. The other end of the electric wires 4 at that time are connected to a lamp (not shown) in the sun visor 1, and pass through the securing shaft 3 and arranged therein. The grommet screws 13 may be previously formed with a securing hole so that the securing pawls 14a can easily pierce the grommet screws 13.

Figure 4A:
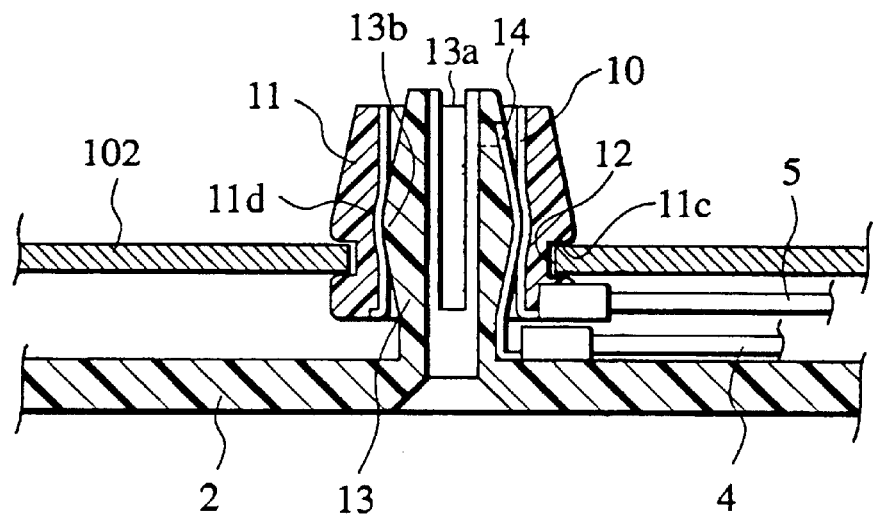

According to this sun visor securing structure, after the harness-side connection ends 11 is temporarily secured to the securing holes 12 of the panel 102, the grommet screws 13 are inserted into the harness-side connection ends 11 to temporarily secure the bracket 2 (see FIG. 4A). Then, the bolt members 15 are screwed into the grommet screws 13, thereby finally secure the bracket 2 and the harness-side connection ends 11 to the panel 102 (see FIG. 4B). With this final securing operation, the sun visor 1 can be mounted to the vehicle body while electrically connecting the visor-side connection terminals 14 and the wire harness-terminals 10 with each other.

At that time, since the harness-side connection ends 11 are secured to the securing holes 12 of the panel 102 only temporarily, the harness-side connection ends 11 are not inserted into the securing holes 12 forcibly and thus, the harness-side connection ends 11 are not damaged nor deformed when they are temporarily secured.

Further, the grommet screws 13 of the bracket 2 are not directly inserted into the securing holes 12 of the panel 102, but inserted into the harness-side connection ends 11 which are temporarily secured to the securing holes 12 (see FIG. 4A). Therefore, the bracket 2 is not damaged nor deformed by the edges of the securing holes 12 and the inserting forces of the grommet screws 13 can be reduced by the visor-side connection terminals 14 provided such that they are exposed to the outer surfaces of the grommet screws 13 and by the wire harness-terminals 10 provided such that they are exposed to the inner peripheral surface of the peripheral walls 11a of the harness-side connection ends 11. That is, when the grommet screws 13 are inserted, the friction force can be reduced by the sliding portions of the metal member of the visor-side connection terminals 14 and the wire harness-terminals 10. Thereby, the inserting forces of the grommet screws 13 can be reduced.

When the grommet screws 13 are inserted into the harness-side connection ends 11, since surfaces of the wire harness-terminals 10 and the visor-side connection terminals 14 slide on each other, oxide films formed on the surfaces can be removed. Therefore, excellent electrical connection state formed thereafter can be ensured.

Figure 4B:
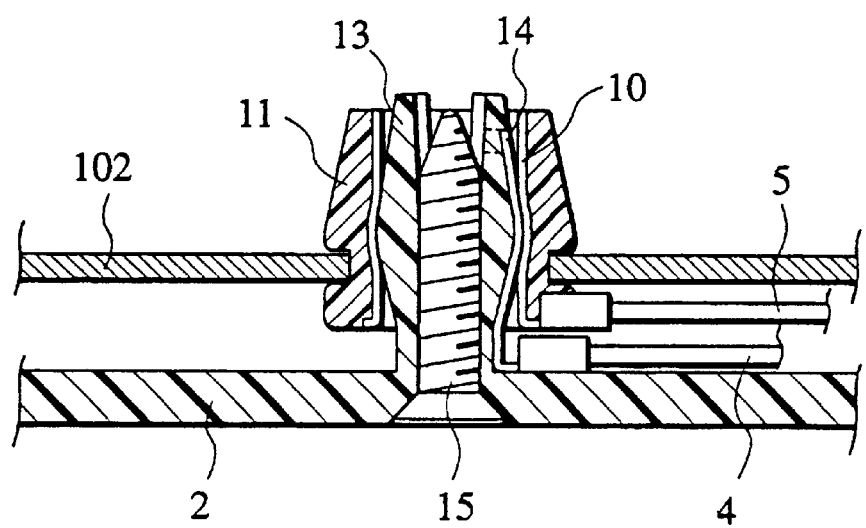

The diameters of the harness-side connection ends 11 and the grommet screws 13 are widened by screwing the bolt members 15, thereby bringing the visor-side connection terminals 14 and the wire harness-terminals 10 into contact with each other under pressure (see FIG. 4B). When the oxide films can be removed, more excellent electrical connection state can be ensured.

After the bracket 2 is finally secured to the panel 102, the bracket 2 is protected by the visor-side connection terminals 14 and rigidity of the bracket 2 is enhanced. Therefore, the holding force of the sun visor 1 is enhanced.

In the present embodiment, after the bracket 2 is finally secured to the panel 102, the bracket 2 is covered with a cover 17 for hiding heads of the bolt members 15 as shown in FIG. 2.

In this securing structure, it is preferable as shown in the present embodiment that a central annular portion 13b of each of the grommet screws 13 is formed such as to swell outward, and the inner peripheral surface of each of the harness-side connection ends 11 is formed with an annular recess 11d into which the central annular portion 13b of the grommet screw 13 is fitted (see FIG. 4A).

According to this structure, the bracket 2 is finally secured to the panel 102 in such a manner that the diameters of the grommet screws 13 and the harness-side connection ends 11 are widened, and the central annular portions 13b of the grommet screws 13 are fitted into the annular recesses 11d of the harness-side connection ends 11. Therefore, the holding force of the sun visor 1 is enhanced.

Figure 5:
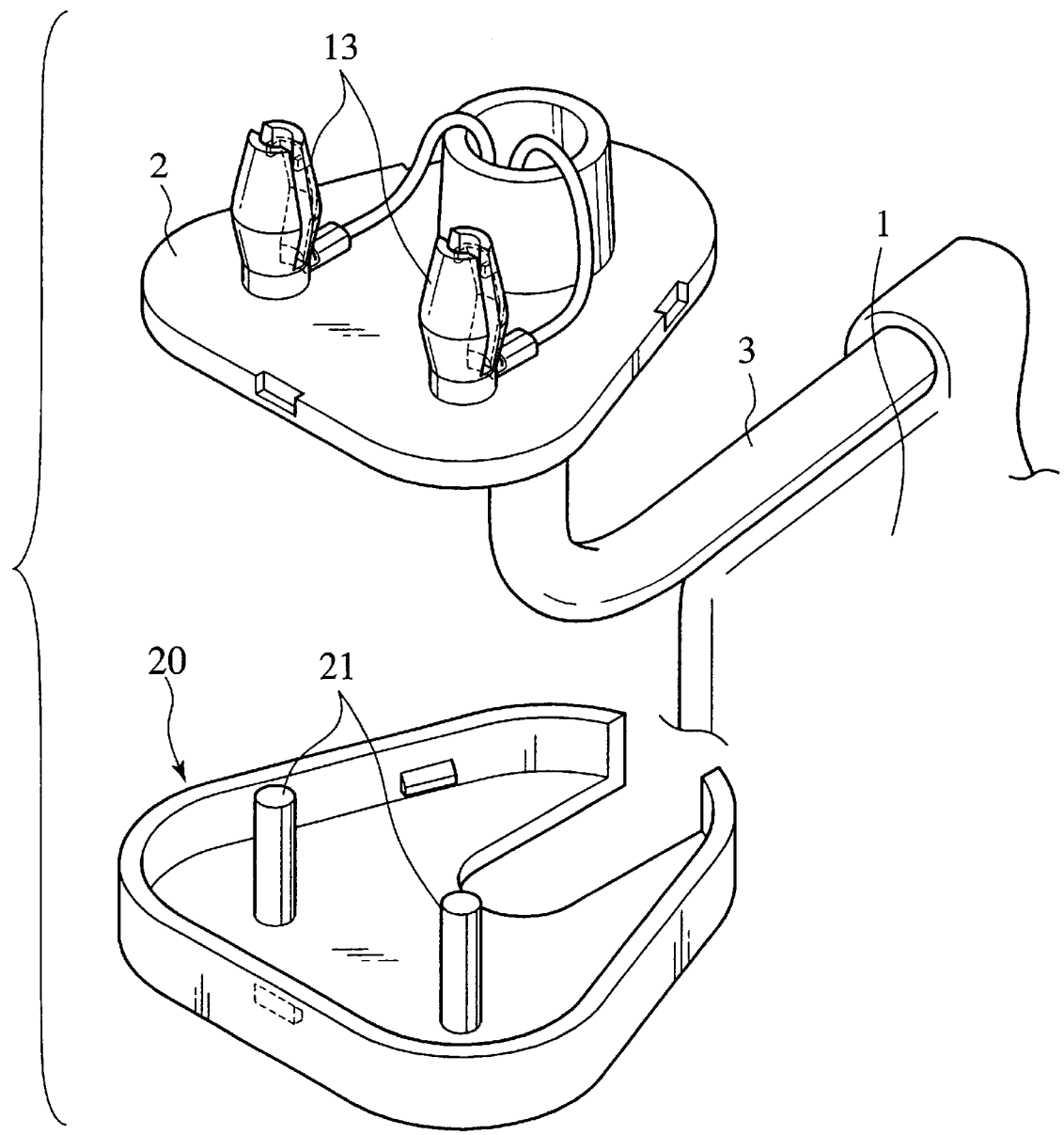
FIG. 5 is an exploded perspective view showing a securing structure of vehicle auxiliary equipment according to a second embodiment of the present invention.

FIG. 5 shows a second embodiment of the present invention. The second embodiment is the same as the first embodiment except the securing means.

That is, in this embodiment, the securing means comprises rod-like projections 21 which are integrally formed with a cover 20 which covers the bracket 2 and the projections 21 are inserted into the grommet screws 13 when the bracket 2 is covered with the cover 20.

According to the second embodiment, the securing means and the cover which were constituted by two members in the first embodiment can be constituted by one member. Further, it is possible to simultaneously widen the grommet screws 13 and cover the bracket 2 with the cover 20 by one operation.

Further, according to the first and second embodiment, swingable and non-supported members are not used as the constituent members and thus, noise is not generated after the final securing operation.

What is claimed is:

1. A securing structure of vehicle auxiliary equipment in which the vehicle auxiliary equipment is electrically connected to wire harnesses arranged between a body and a panel provided on an inner side of said body, and said vehicle auxiliary equipment is secured to said panel through said bracket, said securing structure comprises:

cylindrical harness-side connection ends formed of insulating resin and whose diameters are capable of being widened, said harness-side connection ends having peripheral walls in which wire harness-terminals are embedded, portions of said wire harness-terminals being exposed to inner peripheral surfaces of said peripheral walls;

securing holes formed in said panel and through which said harness-side connection ends are temporarily secured;

grommet screws integrally formed together with said bracket and inserted into said temporarily secured harness-side connection ends;

auxiliary equipment-side terminals connected to electric wires which are led out from said vehicle auxiliary equipment, said equipment-side terminals exposed to outer surfaces of said grommet screws and abutting against the exposed portions of said wire harness-terminals when said grommet screws are inserted into said harness-side connection ends; and securing means which are inserted into said grommet screws in a state in which said grommet screws are inserted into said temporarily secured harness-side connection ends, thereby widening diameters of said harness-side connection ends and said grommet screws to secure said bracket and said harness-side connection ends to said securing holes.

2. A securing structure of vehicle auxiliary equipment according to claim 1, wherein said securing means are bolt members screwed into said grommet screws.

3. A securing structure of vehicle auxiliary equipment according to claim 1, wherein said securing means are rod-like projections which are integrally formed together with a cover covering said bracket, and which are inserted into said grommet screws when said cover covers said bracket.

4. A securing structure of vehicle auxiliary equipment according to claim 1, wherein a central annular portion of each of said grommet screws is configured to swell outward, and an inner peripheral surface of each of said harness-side connection ends is formed with an annular recess into which said central annular portion of said grommet screw is fitted.

* * * * *